Figure 8:
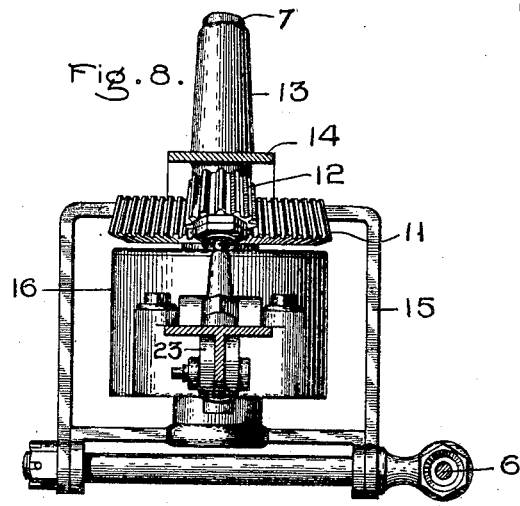

No. 806,684.　　　　　　　　　　　　　　　PATENTED DEC. 5, 1905.
H. LEMP.
STEERING MECHANISM FOR SELF PROPELLED VEHICLES.
APPLICATION FILED JAN. 13, 1904.
6 SHEETS—SHEET 1.
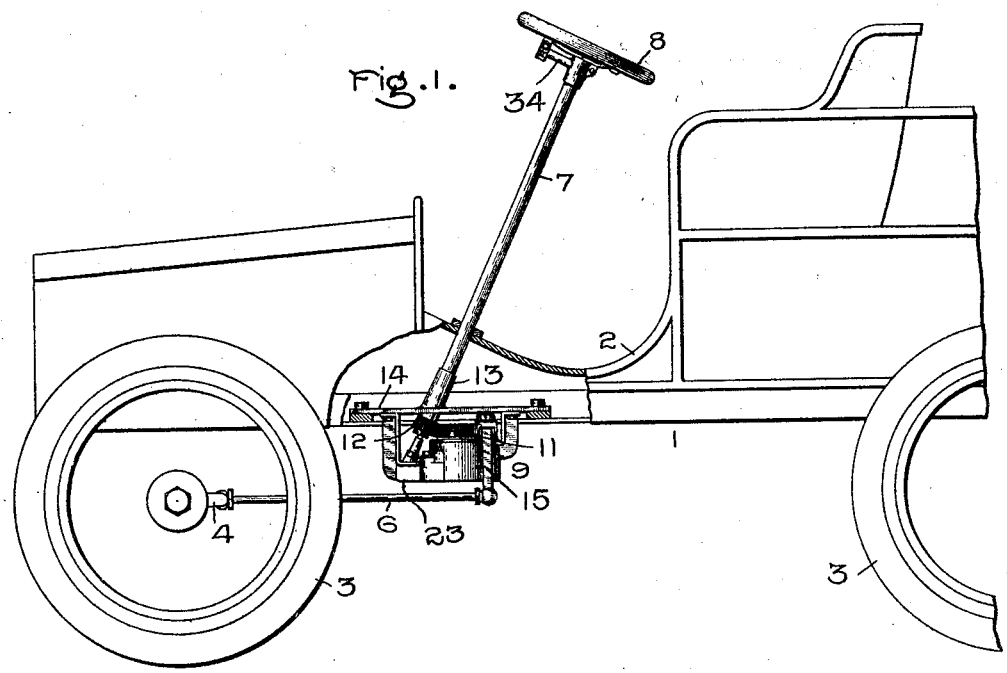
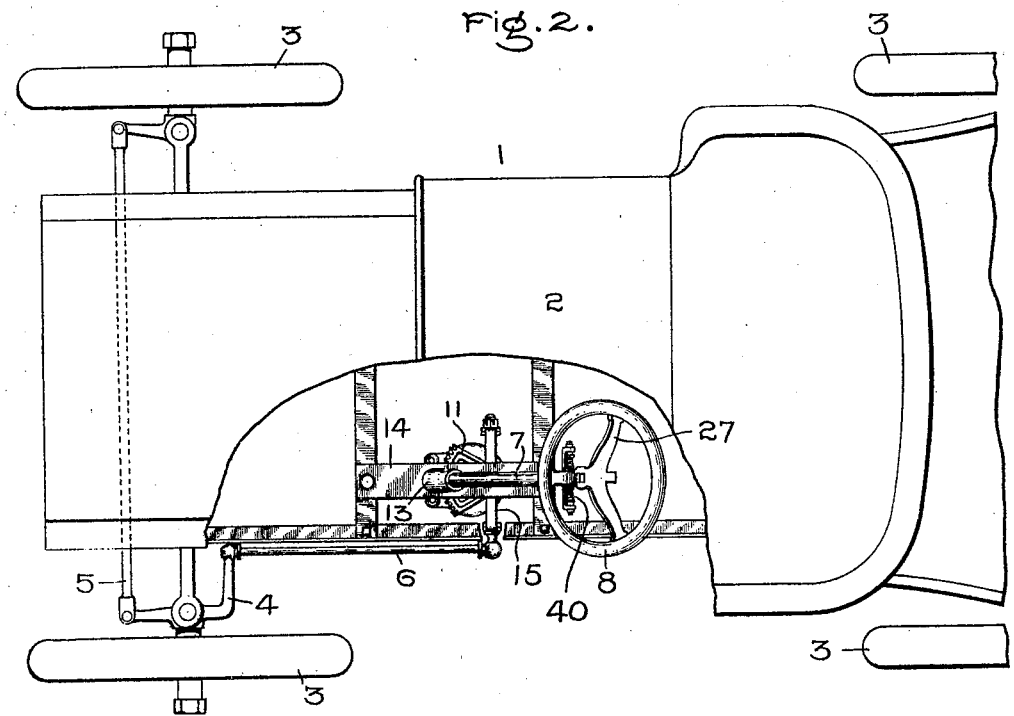
Witnesses:　　　　　　　　　　　　　　　　　　　　Inventor,
Marcus L. Byng.　　　　　　　　　　　　　　　　　Hermann Lemp,
Alex. F. Macdonald.　　　　　　　　　　　　　　By Albert H. Davis
　　　　　　　　　　　　　　　　　　　　　　　　　　Att'y.

No. 806,684. PATENTED DEC. 5, 1905.
H. LEMP.
STEERING MECHANISM FOR SELF PROPELLED VEHICLES.
APPLICATION FILED JAN. 13, 1904.
6 SHEETS—SHEET 2.
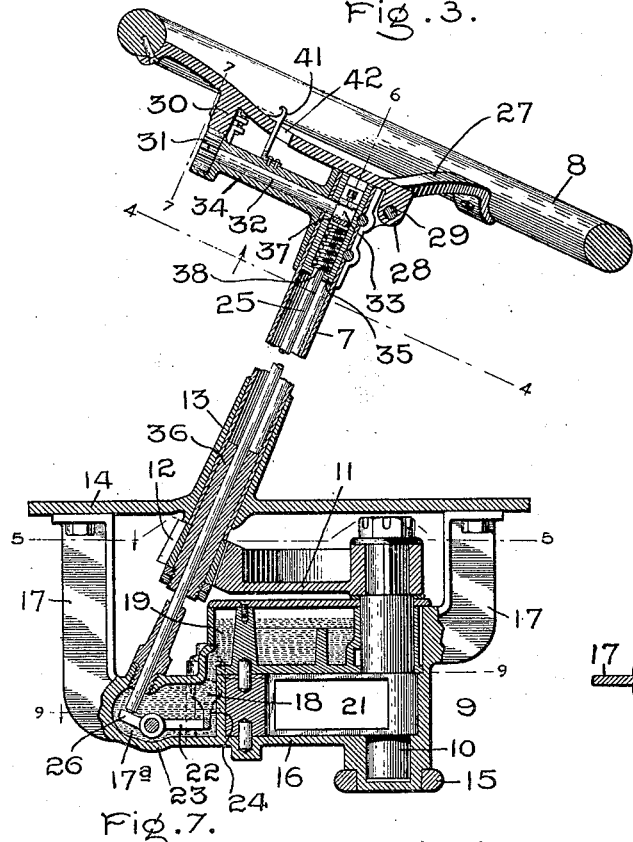
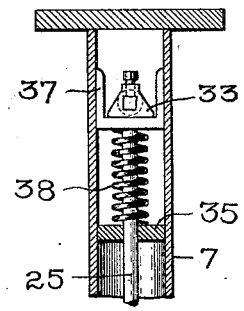
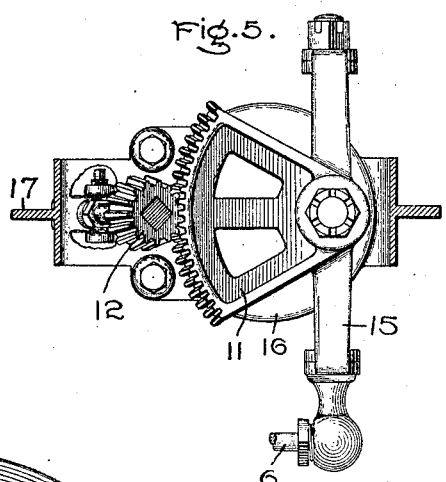
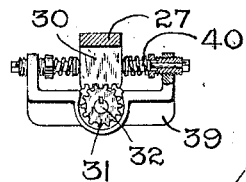
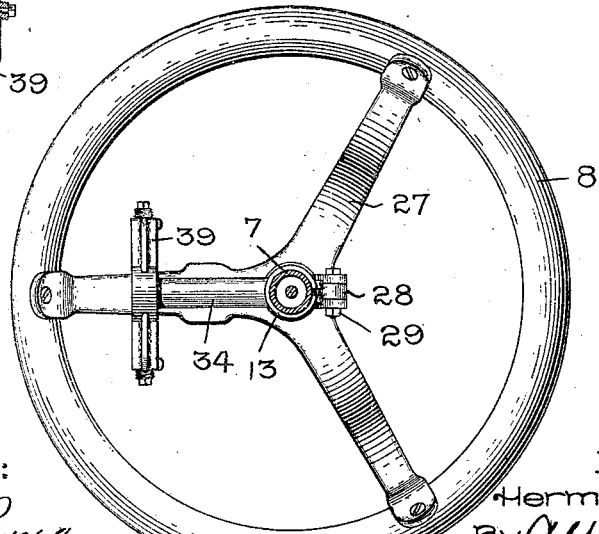
Witnesses:
Marcus L. Byng.
Alex F. Macdonald.
Inventor,
Hermann Lemp,
By Albert G. Davis
Att'y.

No. 806,684. PATENTED DEC. 5, 1905.
H. LEMP.
STEERING MECHANISM FOR SELF PROPELLED VEHICLES.
APPLICATION FILED JAN. 13, 1904.

6 SHEETS—SHEET 3.

Witnesses:
Marcus L. Byng.
Alex F. Macdonald.

Inventor,
Hermann Lemp,
By Albert G. Davis
Att'y.

No. 806,684. PATENTED DEC. 5, 1905.
H. LEMP.
STEERING MECHANISM FOR SELF PROPELLED VEHICLES.
APPLICATION FILED JAN. 13, 1904.
6 SHEETS—SHEET 4.
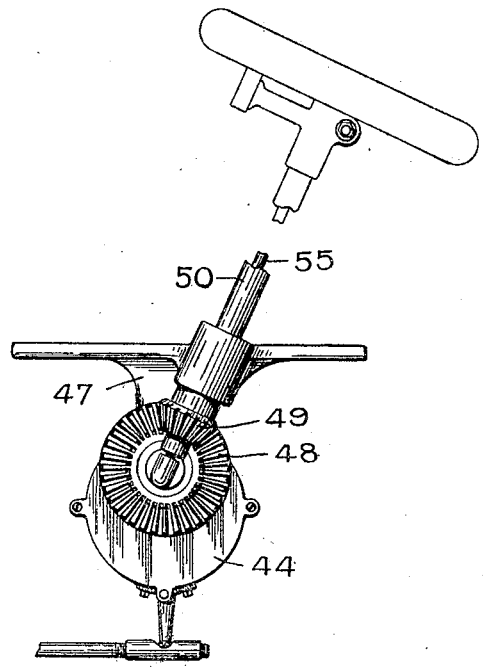
Fig. 11.
Fig. 12.
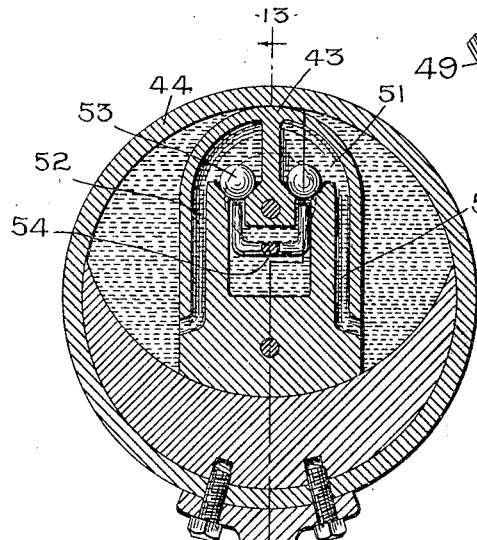
Fig. 13.
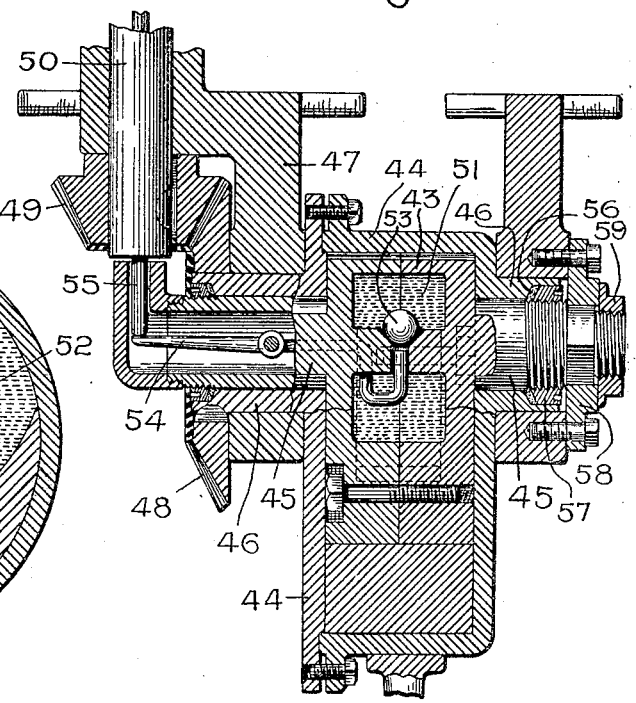
Witnesses:
Marcus L. Byng
Alex F. Macdonald
Inventor,
Hermann Lemp,
By Albert H. Dunn
Att'y.

No. 806,684. PATENTED NOV. 28, 1905.
H. LEMP.
STEERING MECHANISM FOR SELF PROPELLED VEHICLES.
APPLICATION FILED JAN. 13, 1904.
6 SHEETS—SHEET 5.
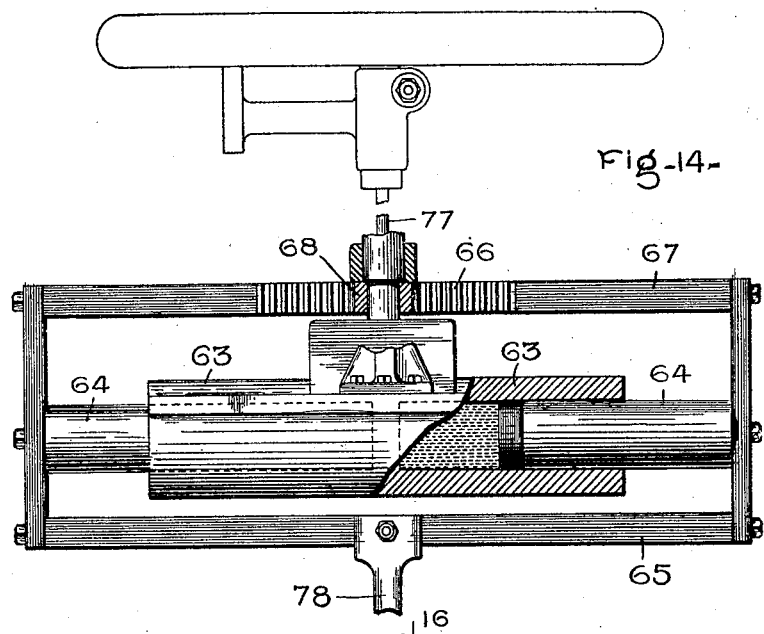
Fig-14-
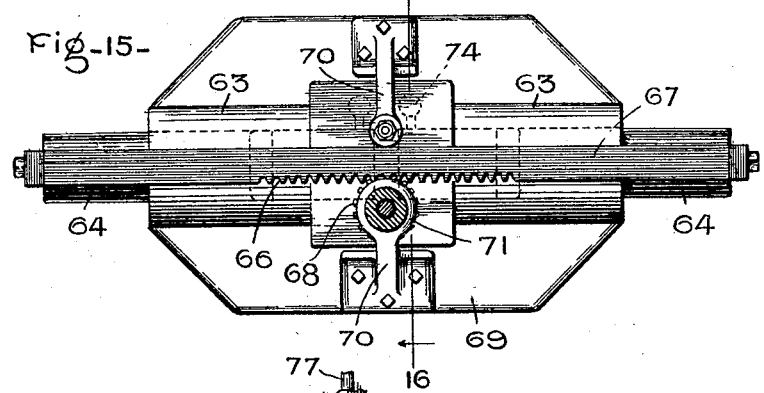
Fig-15-
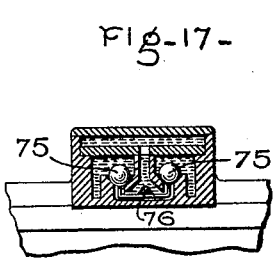
Fig-17-
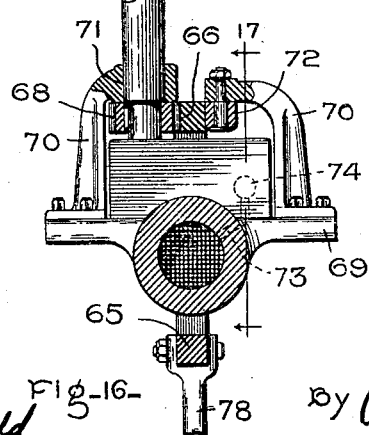
Fig-16-
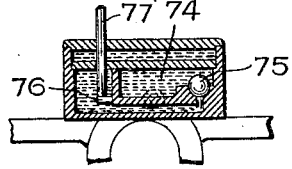
Fig-18-
Witnesses:
Marcus L. Byng
Alex F. Macdonald
Inventor,
Hermann Lemp,
By Allen S. Davis
Atty

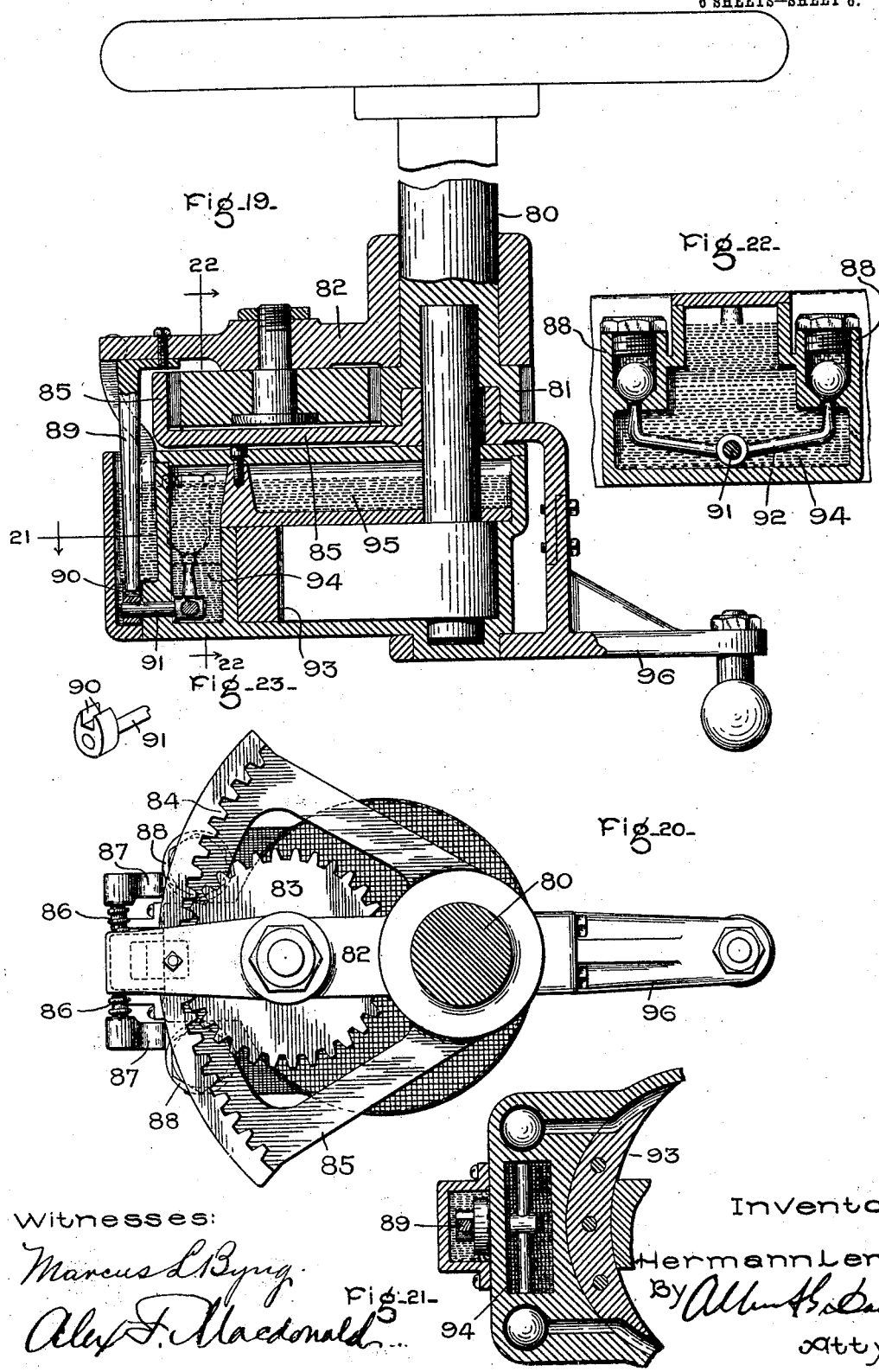

UNITED STATES PATENT OFFICE.

HERMANN LEMP, OF LYNN, MASSACHUSETTS, ASSIGNOR TO GENERAL ELECTRIC COMPANY, A CORPORATION OF NEW YORK.

STEERING MECHANISM FOR SELF-PROPELLED VEHICLES.

No. 806,684. Specification of Letters Patent. Patented Dec. 5, 1905.

Application filed January 13, 1904. Serial No. 188,848.

*To all whom it may concern:*

Be it known that I, HERMANN LEMP, a citizen of the United States, residing at Lynn, county of Essex, State of Massachusetts, have invented certain new and useful Improvements in Steering Mechanism for Self-Propelled Vehicles, of which the following is a specification.

In my prior United States Patent No. 692,868, dated February 11, 1902, I have described and broadly claimed a steering mechanism for vehicles wherein a motion-checking device is interposed between the steering handle or lever and the steering wheel or wheels, the object of said device being to prevent the transmission of strains from the steering-wheels, due to road obstructions, to the hand of the operator. In the particular embodiment of the invention illustrated in the patent a construction is shown wherein relatively movable members are provided, one of said members being connected to the steering handle or lever and the steering wheel or wheels, while the other member is connected to a part of the vehicle, such as the front stationary axle. The movable member, which I will call the "piston," divides the stationary member or cylinder into two compartments, each of which is filled with a fluid compound. The passage of fluid from one compartment to another is regulated by valves under the control of the steering-lever, the arrangement being such that the proper valve is opened when the lever is moved in the direction to steer. When the valves are closed, the free exchange of fluid between cylinder-compartments is prevented, and the piston is therefore locked in position and the transmission of road strains to the hand of the operator prevented. With this construction the relation of the parts is one to one—that is to say, the hand-operated lever is directly connected to the movable part of the check. Consequently there is no multiplication of power possible between the hand-operated lever and the movable member of the steering-check without proportionally increasing the lost motion. To state the matter in a different way, the handle and moving part of the check have corresponding movements for a given change in position of the road steering-wheels, and any attempt to depart from this relation involves an increase in the amount of lost motion between the hand-wheel or lever and the road steering-wheels.

It is common practice in automobile construction, especially for high-powered vehicles, to provide a hand-wheel which is connected to the steering-wheels by power-multiplying devices, such as a worm and worm-wheel. When the worm and worm-wheel are new, or practically so, the parts are irreversible—that is to say, pressure applied to the road steering-wheels will not be transferred to the hand-wheel. On the other hand, when the parts are worn strains will be transmitted to the hand of the operator. Obviously most of the work of steering is done by the central or intermediate parts of the gearing, since for the greater part of the time the vehicle is moving in a straight or relatively straight line. This means that the relatively small central parts of the gearing being constantly in use become badly worn, and it is impossible to adjust them because the end portions would then be too tight. As the parts wear the backlash in the gears is an ever-increasing factor and the operator has to continually swing the hand-wheel back and forth over a wide arc as he steers, during which arc no movement is transmitted to the steering-wheels. The more the gearing is worn the greater will be the effect of the strains transmitted by the steering-wheels to the hand of the operator. To state the matter in different words, the evil due to backlash or lost motion is an ever-increasing one, and the labor of steering is constantly increasing. In addition to this the steering becomes more and more uncertain. There is another type of wheel-steering mechanism wherein bevel or spur gears are employed having large wearing-surfaces with a multiplication of power between the hand-wheel and the road steering-wheels. This arrangement overcomes to a large degree the principle trouble with the worm-gearing, but it is open to the serious objection that all of the road strains are transmitted directly to the hand of the operator.

From the foregoing it will be seen that there are two general types of geared steering mechanisms, one coming under the head of irreversible steering mechanisms, in which the bearing-surfaces are of necessity too small, the other coming under the head of reversible steering mechanism, wherein the bearing-surfaces are large, but in which all road strains are felt by the operator.

The present invention relates to apparatus of the types above described, and has for its object to provide a steering mechanism which includes a hydraulic motion-checking device, and more especially intended for high-speed or heavy automobiles wherein a mechanical connection is employed to transmit and multiply the power between the operating hand-wheel or lever and the steering-wheels and the moving part of the motion-checking device without the objectionable feature of a large initial lost motion between the hand-wheel or lever and the steering-wheels or one which is always increasing with use, as above referred to.

The essential feature of the invention is to provide a steering mechanism having a power-multiplying device between the hand-wheel or lever and the steering-wheels with a lock or motion-checking device independent of or separate from the power-multiplying device for preventing the transmission of road strains, whereby the lost motion between the controlling and controlled parts is made a fixed quantity for all times, the said lost motion utilized in controlling the lock or motion-checking device being made so small as to be negligible.

In carrying out my invention the movable part of the check is attached by rods or equivalent devices with the wheel or wheels to be steered. The stationary member of the check is attached to a fixed support, such as the body of the vehicle or the main axle which carries the short knuckle-jointed axles. Between the two principal members of the check are bodies of normally quiescent fluid, such as oil or glycerin, and the flow of fluid from one body to another is controlled by valves which are under the control of the operator. These valves may be opened or closed simultaneously, or one may be opened positively and the other permitted to open, due to fluid flow.

Operatively mounted with respect to the parts of the check is a device for actuating the movable member thereof and also the steering wheel or wheels. In the present illustration of the invention this device comprises a steering-post which may occupy a position perpendicular to the body of the vehicle or at an angle thereto, as is most convenient. The steering-post is connected to the movable member of the check through a suitable power-transmitting device, such as gearing having large bearing-surfaces. It is preferable to so arrange the device that there is a multiplication of power between the hand-wheel or lever and the movable part of the check, and consequently between it and the steering wheel or wheels. In this way it requires a considerable motion of the hand-wheel or lever for a relatively small motion of the steering-wheels, which is conducive to steadiness of operation, particularly in vehicles traveling at high speeds. The hand-wheel or lever is connected to the steering-wheels through a means including a lost motion, which motion, however, is reduced to a minimum and remains a fixed quantity. This lost motion is necessary to provide for the opening of the proper valve or valves that control the passage of fluid from one chamber of the check to another. Between the valves controlling the check and the hand-wheel or lever is an actuator which opens a valve or valves when it is desired to steer. This actuator is so combined with the hand-wheel that the initial movement of the latter in the direction to steer first opens the proper valve or valves and thereafter moves the wheels. The opening and closing of the valves takes place automatically and requires no thought or special act on the part of the operator. As soon as the hand-wheel is relieved from pressure the valve-actuator is automatically brought to a neutral position and the valves are permitted to close and confine a body of non-compressible fluid on each side of the moving member of the check.

The valves are operated by the member of the steering mechanism having the greatest movement for a given change in position of the road-wheels. Hence the lost motion necessary in order to insure the opening of the valve or valves is reduced to a minimum. In fact, this lost motion is no greater than that due to the backlash in the best type of wheel steer when the latter is new and is much less than is found in wheel-steering devices which have been used even for a short time.

The invention may be carried out in a variety of ways, some examples of which I have illustrated in the drawings and described in the body of the application.

Figure 9:
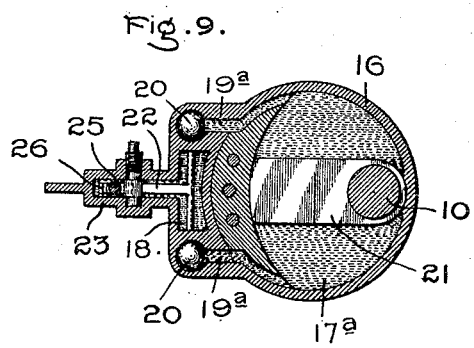
Figure 10:
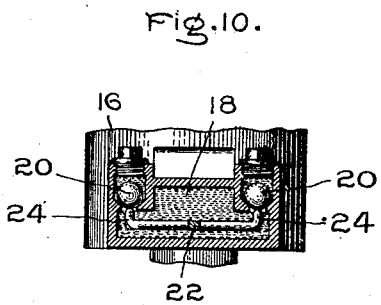

In the accompanying drawings, which illustrate several embodiments of my invention, Figures 1 and 2 are respectively partial views in side elevation and in plan of an automobile with the improved steering mechanism applied. Fig. 3 is a central vertical section of the wheel-steering mechanism and hydraulic checking device, drawn on an enlarged scale. Fig. 4 is a bottom plan view of the hand-wheel and part of the valve-actuating arrangement, taken on line 4 4, Fig. 3. Fig. 5 is a top plan view of the gearing and the hydraulic checking means, taken on line 5 5, Fig. 3. Fig. 6 is a detail section taken on line 6, Fig. 3, of the upper portion of the steering-post and showing the cam-operating means for controlling the hydraulic checking device. Fig. 7 is a detail view of part of the valve-actuator mechanism, taken on line 7 7, Fig. 3. Fig. 8 is a front elevation of the gearing and hydraulic checking mechanism. Fig. 9 is a horizontal section of the hydraulic checking mechanism, taken on line 9 9, Fig 3. Fig. 10 is a transverse section of the latter through the valve-chamber thereof, showing the locking-valves and valve-actuator. Fig. 11 is a side elevation of a modified form of steering mechanism wherein the hydraulic checking device is provided with a stationary piston and a movable casing or cylinder. Fig. 12 is a central vertical section taken through the checking device of this modification and drawn on an enlarged scale. Fig. 13 is a vertical section thereof on line 13 13, Fig. 12. Fig. 14 is a front elevation of a further modification of the checking device and the gearing. Fig. 15 is a plan view of the same with the steering-wheel removed. Fig. 16 is a transverse vertical section taken on line 16 16, Fig. 15. Fig. 17 is a detail section of the valve mechanism, taken on line 17 17, Fig. 16. Fig. 18 is also a detail section of the valves and actuating means therefor, taken at right angles to that of Fig. 17. Fig. 19 is a vertical section of a further modification in which the hydraulic checking device is substantially the same as that shown in the main illustration; but the lost-motion device and valve-actuating means are arranged in coöperative relation with the gearing members instead of being located on the steering-post and hand-wheel. Fig. 20 is a top plan view of this last modification. Figs. 21 and 22 are respectively detail sections taken on lines 21 and 22, Fig. 19, showing the valves and actuator therefor; and Fig. 23 is a minor detail view of a portion of the valve-actuating means.

My invention is equally adapted to either an inclined or a vertical steering-post, and in the several modifications shown in the drawings I have selected to illustrate various adaptations to both kinds of steering-posts.

Referring to Figs. 1 and 2, 1 represents an automobile, such as a touring type of car, of which 2 is the body and 3 the road-wheels, the front ones thereof being mounted on short knuckle-jointed axles 4, which are connected by a drag-link 5 and, further, connected with my improved steering device, hereinafter to be explained.

In Figs. 1 to 10, inclusive, the steering mechanism is shown applied to an inclined steering-post. The main parts of the mechanism consist of a steering-post 7, a hand-wheel or lever 8, that is connected to the post through a connection having a limited amount of lost motion and a hydraulic motion-checking device 9 intermediate the post, and a steering link connection 6 for the road-wheels. The movable part or piston of the check is applied to the short vertical shaft 10, Fig. 3, which is connected with the steering-post through a segmental gear 11, keyed to the shaft and a pinion 12, carried by the steering-post. The ratio between these gears can be made anything that is desired, and the surfaces of the gear-teeth should be made large to reduce the wear. The shaft 10 is arranged out of axial alinement with the post and is adapted to have a lower rate of movement than the post by reason of the character of the intervening gearing. The primary function of this gearing is to multiply the power transmitted from the steering-post to the shaft, which proportionately reduces the range of movement of the latter. The inclined steering-post 7 is mounted in an inclined socket or tubular extension 13, formed on a supporting-plate 14, which is rigidly bolted to the frame of the vehicle, Figs. 1 and 2. The shaft 10 is preferably mounted in the casing of the check, which casing is rigidly secured to the under side of supporting-plate 14, Figs. 1 and 3. A frame 15 is attached rigidly to the shaft 10 and provides connection between the steering-wheels through the link connection 6, Figs. 2 and 8. It is preferable to attach the moving part of the check directly or as directly as possible to the steering-wheels, since by so doing the wheels can be rigidly locked in any given position, and this without regard to any looseness existing between the check and the hand-wheel. This not only relieves the hand of the operator from road strain, but it prevents the strains from being imparted to the gears, and thereby reduces the wear and tear thereon. A convenient arrangement is to attach the piston of the check to the shaft 10, carried by the casing. The check is controlled by valves or equivalent devices, which are moved during the interval that the hand-wheel is taking up the lost motion in the connection between it and the steering-post. Actuating the valves through the medium of the hand-wheel or the member having the greater movement for a given change in position of the steering-wheels results in minimizing the idle or lost motion between the hand-wheel or lever and the steering-wheels. To state the matter in a different way, the valves are under the control of the relatively quick moving member of the steering mechanism, while the check itself is attached to the relatively slow-moving member or the road steering-wheels. The checking device comprises a casing 16, provided with supporting members or arms 17, by which the same is rigidly attached to the supporting-plate 14, a piston-containing chamber 17$^a$, a valve-chamber 18, and an auxiliary chamber or reservoir 19, which is in open communication with the valve-chamber. These chambers contain a suitable mobile medium which is normally inactive, and the substance best suited for this purpose has been found to be glycerin, which retains its fluid state through a wide range of temperature. Communication between the piston and valve chambers is afforded by means of passages 19$^a$, Fig. 9, which are normally closed by ball-valves 20. Eccentrically mounted in the piston-chamber is a piston 21, which is rigidly attached to or integral with the shaft 10 and divides the piston-chamber into two compartments. The passages 19 are arranged to communicate each with one of these compartments, so that when the valves are opened the fluid may be freely transferred from one compartment to the other and permit motion of the piston. The ball check-valves 20 are adapted to be actuated by means of a tilting lever 22, Figs. 3, 9, and 10, pivotally mounted in an extension 23 of the valve-chamber. This tilting lever is branched at one end and terminates in upturned tips 24, that engage with the under side of the ball-valves. The pivotal mounting of the lever is eccentric to its center of gravity, so that it will automatically return to its normal position after being actuated—that is to say, it drops away from the valves and permits them to close. By reason of the permanent communication between the auxiliary chamber and the valve-chamber leakage in the compartments of the piston-chamber is compensated for and the compartments are maintained constantly filled, so as to prevent any lost motion of the piston. The extension 23 of the valve-chamber projects preferably to a point which alines with the axis of the steering-post. The purpose of this arrangement is to place the lever 22, which controls the ball-valves, in such a position as to readily coöperate with the actuator carried by the steering-post. This latter mechanism comprises a longitudinally-movable rod or actuator 25, which is mounted in the steering-post and at its lower end engages with the forwardly-projecting arm 26 on the tilting lever, which moves the ball-valves, Fig. 3. The hand-wheel or lever for steering is connected to the steering-post through a lost-motion connection, and during the interval that this lost motion is being taken up motion is being communicated to the valve-actuator through suitable means. The spider-shaped frame 27 of the hand-wheel is provided with a pivotal lug 28 at its center or hub, which is loosely mounted on a pivot 29 of a hinge connection at the upper end of the steering-post. This loose pivotal mounting is of such a character as to permit of a limited rotary movement relative to the post. The lost motion between the hand-wheel and steering-post is extremely limited for obvious reasons, and in order to utilize it to the best advantage, so as to obtain considerable movement of the valve-actuating mechanism, a rack 30 and pinion 31 are provided for operating a shaft 32, which carries a cam 33, by means of which motion is imparted to the rod 25. The rack 30 is shown in Figs. 3 and 7 as formed on the under side of one spoke of the spider-shaped frame 27 of the hand-wheel, and the shaft 32, carrying the pinion 31, is mounted in the radially-extending arm 34, which is rigidly attached to the upper end of the steering-post and disposed under and in a parallel plane with the hand-wheel. The cam 33 is symmetrical, so that rotation in either direction will impart a longitudinal motion in one direction of the rod 25. This rod or actuator 25 is centered in the steering-post by a guide 35 at the upper end and a bushing 36 at the lower end, and the upper extremity of the rod 25 carries a yoke-shaped piece 37, with which the cam 33 engages. Intermediate the piece 37 and the upper guide 35 is a compression-spring 38, that is adapted to return the rod 25 after actuation and to maintain the cam 33 in neutral position relatively to the engaging surface of the yoke 37. As the rod 25 is normally held in withdrawn position, it permits the unevenly-balanced tilting lever 22 to occupy a position that allows the valves 20 to seat themselves due to their own weight. The operative relation between the arm 26 of the lever and the lower end of the rod 25 is maintained constant by means of its unstable balance, so that any movement of the rod will operate the lever without lost play. This construction permits the valves to close with certainty and reduces the longitudinal movement of the actuator 25 to a minimum, and thereby the amount of lost motion between the steering-wheel and the post.

It is necessary in providing a lost-motion connection between the hand-wheel and steering-post to provide a stop arrangement for arresting the lost motion, whereby the wheel and the steering-post become substantially rigid in their relation and revolve together. This is obtained by providing a frame 39 at the outer end of the arm 34, which is rigid with the steering-post. This frame carries the stop arrangement above mentioned, which comprises stops preferably of the spring-buffer type, and, as shown in Fig. 7, they consist of spring-actuated followers 40, which are held in constant contact with suitable portions of the hand-wheel, preferably the end faces of the rack 30, whereby they yield to a limited extent to motion of the hand-wheel. These followers are mounted in screws that engage in the frame 39, so that adjustment of the tension of the springs of the buffers is rendered possible. These spring-buffers also serve to center the wheel and valve-actuator with respect to each other, thereby permitting the ball-valves to close and hold the movable member of the check in a fixed position.

It will be noted that by means of the construction shown the lost-motion device permits of the movement against the tension of the spring-buffers and also of the spring 38. This movement of the hand-wheel should preferably be made against a pressure which is not perceptibly distinguished while operating through the range of lost motion from the effective steering portion of the movement of the hand-wheel, so as not to be objectionable to the operator of the vehicle. Furthermore, by reason of the rack and pinion 30 and 31 being at a remote point from the axis of turning they permit of considerable rotary movement of the shaft 32, which carries the cam 33, so that the range of movement permitted by the lost-motion connection need not be very great and when compared with the full range of the steering movement is almost unnoticeable.

As the hand-wheel is capable of tilting on the steering-post, it is necessary to provide means for maintaining the rack 30 in mesh with the pinion 31, and for this purpose a spring-latch 41 is attached to the radial arm 34 of the steering-post, which is adapted to engage in the slot 42 of the spoke of the hand-wheel which carries the rack. By releasing the latch against its tension the wheel is permitted to tilt on the pivot 29 for the purpose of permitting easy entrance to and exit from the vehicle.

The operation of the steering mechanism takes place as follows: The initial rotative movement of the hand-wheel is always taken up in the lost-motion connection irrespective of the direction of motion. In other words, the spring-buffers and the spring 38 coact in such wise as to maintain the lost-motion device in a normal or central position respecting the range of motion of the wheel, so that whether the wheel be rotated to the right or to the left the first part of the movement will be taken up in lost motion, so that the valve-actuating mechanism will always be positively actuated. During the initial movement of the hand-wheel the rack rotates the shaft through the pinion 31, tipping the cam 33, whereby the actuator 25 is depressed, and through the lever 22 the ball check-valves 20 are opened, so that the two compartments in the piston-chamber are placed in communication with the valve-chamber. With the parts in this open position the locking fluid in the hydraulic checking device offers no resistance to motion of the piston. The effective steering movement of the hand-wheel follows in continuity with the lost motion, for at the limit of the lost motion the hand-wheel and shaft move as a single rigid structure, operating to impart motion to the shaft 10 through the intermeshing pinion 12 and segmental gear 11, so that the steering road-wheels are thereby actuated according to the direction the hand-wheel is turned. As soon as power is released from the hand-wheel the buffers come into play, and by reason of the tension of their spring they react, so that the valve-actuator 25 is returned and the ball-valves become seated, whereby communication between the compartments of the piston-chamber and valve-chamber is interrupted and the piston locked in the position which it occupies when pressure is removed from the hand-wheel. This same operation takes place every time the hand-wheel is turned for the purpose of steering, and the valve mechanism is capable of operation in every position within the steering range.

The modification shown in Figs. 11 to 13 involves a construction in which the piston-chamber of the hydraulic checking device is the rotative member while the piston is stationary. The lost-motion device which controls the action of the valve-actuating mechanism is the same as that shown and described in connection with the main construction, Fig. 3. A piston 43 is provided in the casing 44 and mounted eccentrically therein by trunnions 45. The casing 44 is also provided with trunnions 46, which are hollow for receiving the piston-trunnions. The checking device as a whole is supported by means of hangers 47, extending from an integral supporting-plate. To one of the casing-trunnions 46 a beveled gear 48 is keyed, which meshes with the pinion 49, keyed to the lower end of the steering-post 50. These gears are so proportioned that the power transmitted from the steering-post is multiplied between the same and the steering-wheels of the vehicle. As shown in Fig. 12, the valve-chamber for the check is provided in the piston. This chamber is connected with compartments 51 on opposite sides of the piston by passages 52, which are controlled by valves 53. For actuating the valves a tilting lever 54 is mounted in one of the trunnions and is actuated by the rod 55, mounted in the steering-post. This tilting lever is bifurcated at its valve-engaging end, and when the same is tilted on its pivot it opens the valves simultaneously, thereby permitting communication between the compartment 51 through the valve-chamber and passage 52. In order to prevent leakage between the piston-trunnion and the hollow trunnion of the casing, packings 56 and adjusting-gland 57 are provided. One of the piston-trunnions is provided with a squared portion, which is engaged by a collar 58, having a square opening. This collar is rigidly held in place by bolting the same to one of the adjacent hangers 47, and engaging the collar 58 is a locking-nut 59. In operation the initial movement of the hand-wheel is taken up in the lost-motion connection for opening the valves of the checking device, and the continued motion of the steering-wheel is communicated through the steering-post to the casing of the hydraulic check through the intermeshing gears. Extending from the casing is an arm 60, by means of which connection is afforded with the system of linkage between the steering device and steering road-wheels.

As stated hereinbefore, the steering mechanism is applicable to the vertical steering-post. The modification illustrated in Figs. 14 to 18 is one embodiment of this feature. A hydraulic checking device is provided which is controlled by a valve mechanism similar in general respects to that already described and operated by a similar actuating mechanism. In detail the hydraulic checking device consists of two oppositely-disposed axially-alining cylinders 63, open at their outer ends and in each of which is provided a piston 64, having a suitable hydraulic packing. These pistons are mounted on a rectangular frame 65, which carries a rack 66 on the upper bar 67 thereof. This rack is designed to mesh with a pinion 68, keyed to the end of the steering-post. The cylinders 63 are preferably an integral casing formed with a plate 69, to which are secured overhanging supporting-standards 70, Fig. 16. One of these standards is provided with an eye 71, in which the lower end of the steering-post is rotatably guided, and the other standard carries an antifriction-roller 72, that impinges upon the upper bar 67 of the rectangular frame 65, and thereby retains the pinion and rack in mesh. The interior of the cylinder 63 communicates, through passages 73, with a valve-chamber 74, Figs. 16 and 18. The passages 73 are normally closed by check-valves 75, which are adapted to be opened by the tilting lever 76 under the influence of the actuator 77. An arm 78 is secured to the lower bar of the frame 65, whereby connection is afforded between the steering mechanism and the wheels of the vehicle. In this modification the rectangular frame 65 is shown to be the movable element, while the cylinders are stationary; but the operation could be carried out by permitting the cylinders to move and retain the pistons stationary. The operation of opening the valves is similar to that of the previous modification described, and the transfer of fluid from one chamber to the other takes place in the present instance between the two pistons, one piston moving into its cylinder while the other moves out, and vice versa when the pistons move in opposite directions by the meshing pinion and rack, as will be obviously understood.

In Figs. 19 to 23 a modified form of the lost-motion and valve-actuating mechanism is shown which simplifies the arrangement of the steering-post and hand-wheel. The lost-motion device forms substantially a part of the hydraulic checking device, and the whole constitutes a compact and substantial structure. In this case the shaft which carries the piston of the hydraulic device alines with the steering-post, and the power-multiplying gear comprises a pinion, an internal segmental gear, and an intermediate gear meshing with the two, which are used as a substitute for the disalining members or elements of the steering mechanism hereinbefore described. Referring to the drawings, 80 represents the steering-post, which is provided at its lower end with a pinion 81 rigid therewith. The hydraulic checking device is operated from the steering-post through a lost-motion connection that comprises the arm 82, loosely mounted on the lower end of the steering-post, to which a gear 83 is pivotally secured. This gear is intermediate the pinion 81 and the internal rack or segmental gear 84 on the frame structure 85, which is rigidly attached to the moving element of the hydraulic checking device and also the steering wheel or wheels. The arm 82 being loosely mounted on the steering-post is capable of a slight rotary movement thereon, which movement is limited by spring-buffers 86, carried in projections 87, formed on the piston-containing casing 88. In order to impart this rotary movement to the arm 82, an initial lost-motion of the steering-post is necessary. In initially turning the steering post or pinion 81 the arm 82 is caused to move bodily in a lateral direction by reason of its gear meshing with the segmental rack 84, that is relatively rigid by being connected with the piston element of the hydraulic checking device, which is normally locked. The rotary movement of the arm is for the purpose of controlling the valve mechanism. For this purpose an extending finger 89 is secured to the outer end of the arm 82, which engages at its lower end between lips 90, Fig. 23, or abutments provided on the shaft 91, that permits movement to be transmitted to the valve-tripping lever 92. In the casing are a piston-chamber 93, a valve-chamber 94, and an auxiliary chamber or reservoir 95 in arrangement somewhat similar to that described in connection with Fig. 3. The valve control is slightly different in respect to the turning of the tripping-lever 92, acting only upon one valve at a time, relying upon the other valve to be opened through the pressure of the fluid, due to the movement of the piston. Secured to the frame 85, which carries the rack 84, is a bracket 96, by means of which motion is transmitted from the steering device to the steering-wheels of the vehicle. The operation of this modification takes place first by opening the valves of the hydraulic checking device through the lost-motion connection that moves the arm 82 in either direction, and thereby tilts the valve-trip lever, so as to unlock the piston and permit the continued movement of the steering-post to be communicated through the pinion 81, intermediate gear 83, and rack 84, so that the entire rack-carrying frame 85 and bracket 96 turn together with the piston. The function of the spring-buffers is to limit the movement of the lost-motion device and also to return it to its normal or neutral position in order to place the checking device in operative position when the pressure is removed from the steering-handle.

From the foregoing it will be observed that the checking device constitutes a positive lock between the power-imparting element of the steering mechanism and power-receiving element thereof. Also the arrangement of the lost-motion device on the valve-actuating mechanism is of such a character as to be unobjectionable in the steering operation, as the same has an exceedingly small range of action compared with the full effective steering movement of the hand-wheel.

In accordance with the patent statute I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In combination, a driving and a driven member, a mechanical power-multiplying connection between the members, and a device independent of the connection for preventing the transmission of strains from the driven member to the driving member.

2. In combination, a driving and a driven member, a power-multiplying connection between the members, a device independent of the connection for preventing the transmission of strains from the driven to the driving member, and a means under the control of the driving member for controlling the action of the said device.

3. In combination, a driving and a driven member, gearing between the members so arranged that one member has a greater movement than the other, a locking device for preventing the transmission of strains from the driven to the driving member, and a means controlling the locking and unlocking of the said device which is itself controlled by the member having the greater movement.

4. In a steering mechanism, the combination of a driving and a driven member, a power-transmitting connection between them, and a motion-checking device separate from the connection and controlled by the driving member for preventing the transmission of strains from the driven to the driving member.

5. In a steering mechanism, the combination of a driving and a driven member, a power-transmitting connection between them, a road steering-wheel connected to the driven member, a motion-checking device attached to the driven member which prevents the transmission of strains from the wheel to the driving member, and a controlling means for the checking device which is controlled by the driving member.

6. In a steering mechanism for vehicles, the combination of two movable elements, a driving connection between them which causes one element to move at a rate different from that of the other, and a device independent of the connection which permits only one element to drive the other.

7. In a steering mechanism for vehicles, the combination of a driving and driven element, a connection between them which causes relatively different rates of movement, and a motion-checking device independent of the connection which is locked when the driving element is at rest and is unlocked when said element is actuating the driven element.

8. In a steering mechanism for vehicles, the combination of two operatively-connected members movable on different axes, one being a power-imparting member and the other a power-receiving member having a tendency to reversibility, and a hydraulic motion-checking device which permits the power-imparting member to move the power-receiving member and prevents the latter member from moving the former.

9. In a steering mechanism for vehicles, the combination of two elements connected to have dissimilar movements, a hand wheel or lever on one of the elements, and a hydraulic motion-checking device on the other element which is capable of being operated by the wheel-carrying element and incapable of being operated by the other element.

10. In a steering mechanism for vehicles, the combination of two movable elements, a connection between the two whereby one is caused to have a greater movement than the other, a steering-grip on one of the elements which turns on the axis thereof, a motion-checking device on the other element, and means on the grip-carrying element for controlling the motion-checking device which is operated by the grip during the initial part of its movement.

11. In a steering mechanism for vehicles, the combination of two relatively movable elements, a steering-wheel on one of the elements which is adapted to turn on the axis thereof, a motion-checking device on the other element, and means on the first element which is actuated by the steering-wheel for controlling the motion-checking device.

12. In a steering mechanism for vehicles, the combination of a driving element, a driven element, a power-multiplying connection between them, and means on the driven element which is independent of said connection and is controlled by the driving element for rendering the elements relatively movable or immovable.

13. In a steering mechanism for vehicles, the combination of two elements, power-transmitting means whereby one element operates the other at a different speed, and a hydraulic motion-checking device for controlling the movement of the elements.

14. In a steering mechanism for vehicles, the combination of two elements, power-multiplying gearing operatively connecting the same, a hydraulic motion-checking device on the high-powered element, and a means on the lower-powered element actuated during a definite limited portion of the movement thereof for controlling the checking device irrespective of the relative positions of the elements.

15. In a steering mechanism for vehicles, the combination of two elements, power-multiplying gearing between the elements, a hydraulic motion-checking device on the high-powered element, and means on the lower-powered element for controlling the motion-checking device.

16. In a steering mechanism for vehicles, the combination of two elements, a power-multiplying gearing operatively connecting the same, a hydraulic motion-checking device on the high-powered element, and means for controlling the checking device irrespective of the relative position between the elements.

17. In a steering mechanism for vehicles, the combination of a steering-post, a movable element connected to the road steering-wheels, a gearing between the post and said element, and a hydraulic checking device which acts directly on the movable element for controlling the movement thereof.

18. In a steering mechanism for vehicles, the combination of two elements, one of the elements being a steering-post and the other a connection for the road steering-wheels, power-multiplying gearing operatively connecting the elements, a hydraulic checking device in said connection, and means on the steering-post for controlling the hydraulic checking device.

19. In a steering mechanism for vehicles, the combination of two elements capable of relative movement, power-transmitting means between the same, a hydraulic checking device on one of the elements, a valve mechanism controlling said checking device, and an actuating means for the valve mechanism on the other element and controlled thereby.

20. In a steering mechanism for vehicles, a combination with a steering-post and hand-wheel or lever of a gear carried by said post, a shaft, a gear thereon meshing with a gear on the steering-post, a hydraulic checking device controlling the shaft, a valve mechanism for the hydraulic checking device, an actuating-rod for the valve mechanism mounted on the steering-post, and means on the hand-wheel adapted to actuate said rod upon the initial movement of the hand-wheel or lever.

21. In a steering mechanism for vehicles, the combination of a hydraulic motion-checking device, a steering-shaft, a longitudinally-movable rod carried by the shaft, a hand-wheel or lever mounted on the shaft, and a means on the wheel or shaft for imparting movement to the rod for controlling the checking device.

22. In a steering mechanism for vehicles, the combination of a steering-post, a hand-wheel or lever mounted thereon and having a limited amount of lost motion with respect thereto, a rod carried by the shaft, a device for actuating the rod during the lost motion of the hand-wheel or lever, and a motion-checking device controlled by the rod.

23. In a steering mechanism for vehicles, the combination of a steering-post, a hand-wheel or lever mounted thereon and having a limited amount of lost motion with respect thereto, and actuating mechanism actuated during the period that the hand-wheel is taking up the lost motion, a shaft, power-multiplying gearing between the steering-post and shaft, and a motion-checking device connected to the shaft and controlled by the hand-wheel.

24. In combination, a steering-post, a hand-wheel mounted thereon, a hydraulic checking device, and a valve-actuating mechanism carried by the steering-post, comprising a longitudinally-movable rod mounted in the post, and means actuated by the hand-wheel for moving the rod in one direction.

25. In a steering mechanism, the combination of a steering-post, a hand-wheel, a lost-motion connection between the hand-wheel and steering-post, a hydraulic checking device, an actuator controlling said device, a means adapted to be actuated through the lost-motion connection for imparting motion to the actuator.

26. In a steering mechanism, the combination of a steering-post, a hand-wheel, a lost-motion connection between the hand-wheel and steering-post, means for rendering the lost-motion connection effective to the initial movement of the hand-wheel in both directions, a hydraulic checking device, an actuator controlling said device, a means adapted to be actuated through the lost-motion connection for imparting motion to the actuator.

27. In a steering mechanism, the combination of a steering-post, a steering-wheel, a means connecting the wheel and the post and permitting the tilting of the former, a lost-motion connection between the wheel and post, a hydraulic checking device, an actuator mounted in the post for controlling the checking device, and means for operating the actuator through the lost-motion connection upon initial movement of the wheel.

28. In a steering mechanism, the combination of a steering-post, a tilting hand-wheel mounted thereon, a lost-motion connection between the wheel and post, a spring-controlled actuator mounted in the post, a cam for moving said actuator through the lost-motion connection, and a hydraulic checking device controlled by the actuator.

29. In a steering mechanism, the combination of a steering-post, a hand-wheel or lever, a lost-motion device between the same, a pivotal connection between the hand-wheel or lever and lost-motion device, an actuator carried by the steering-post, and means intermediate the steering-post and hand-wheel for imparting motion to the actuator.

30. In a steering mechanism, the combination of a steering-post, a hand-wheel or lever, a lost-motion device between the hand-wheel and steering-post, means for arresting the lost-motion device arranged on the steering-post adjacent the hand-wheel, and an actuator carried by the steering-post operating through the lost-motion device.

31. In a steering mechanism, the combination of a steering-post, a hand-wheel or lever, a lost-motion device connecting the two, a radially-extending shaft mounted on the upper end of the steering-post, a pinion secured to the shaft, a cam also secured to the shaft, a rack carried by the hand-wheel or lever, means for arresting the movement of the pinion relatively to the rack, and an actuator carried by the steering-post and adapted to be operated by the cam.

32. In a steering mechanism, the combination of a steering-post, a hand-wheel or lever, a lost-motion device connecting the two, a radially-extending arm rigidly carried by the steering-post at its upper end, a revolving shaft mounted therein, gearing between the shaft and hand-wheel, a spring stopping device at the outer end of the radially-extending arm adapted to arrest the lost-motion device, and means carried by the steering-post operated by the revolving shaft.

33. In a steering mechanism, the combination of a steering-post, a hand-wheel or lever mounted thereon, a lost-motion device connecting the two, an actuator on the steering-post, and means for imparting longitudinal movement to the actuator through a slight movement of the hand-wheel or lever.

34. In a steering mechanism, the combination of a steering-post, a hand-wheel or lever mounted thereon through a lost-motion connection, a radially-extending arm rigid with the steering-post at the upper end thereof, a revolving shaft mounted therein, a gearing between the shaft and hand-wheel, a lever, spring-abutments at the outer end of the radially-extending arm for limiting the amount of the lost motion, an actuator carried by the steering-post, means intermediate the revolving shaft and actuator for imparting longitudinal movement to the latter in one direction, and a spring for returning the actuator and coöperating with the spring-abutments for maintaining the lost-motion device in a position normal to its range of movement.

35. In a steering mechanism, the combination of a steering-post, a tilting hand-wheel mounted thereon and capable of a limited rotary lost motion at the beginning of rotation in either direction, an actuator mounted in the post, means coöperating with the actuator and movable with the post, and means on the hand-wheel for operating the first-mentioned means, and a motion-checking device controlled by the actuator.

36. In a steering mechanism, the combination of a steering-post, a hand-wheel or lever mounted thereon and rotatable therewith, a lost-motion connection between the hand-wheel and post, a longitudinally-movable rod in the post, guides for the same, a symmetrical cam for actuating the rod, a radially-extending shaft mounted on the post and movable through a pinion carried by the shaft, a rack on the hand-wheel meshing with the pinion, and a motion-checking device controlled by the rod.

37. In a steering mechanism, the combination of a steering-post mounted to move about its axis, a longitudinally-movable rod therein, a motion-checking means controlled by the rod, and means carried by the steering-post which, when turned in either direction, initially actuates the rod and finally rotates the steering-post.

38. In a steering mechanism, the combination of a hydraulic checking device, a valve mechanism controlling the same, a shaft controlled by the checking device, a steering-post operatively connected to the shaft, and means carried by the steering-post which, when turned in either direction, initially operates the valve mechanism and finally rotates the steering-post.

39. In a steering mechanism for vehicles, the combination of a shaft and a hydraulic checking device controlling the same, the latter comprising a casing, a piston therein rigid on the shaft, a valve mechanism controlling the transfer of the liquid contained in the casing between opposite sides of the piston, a steering-post arranged out of alinement with the shaft, a hand-wheel or lever on the post, and a valve-actuating device operated by the hand-wheel or lever.

40. In a steering mechanism, the combination of a steering-post, a hand-wheel or lever for moving the post, steering road-wheels, a shaft to which they are connected, a power-transmitting connection between the post and the shaft, a motion-checking device separate from said connection which prevents the transmission of strains from the road-wheels and shaft to the hand-wheel or lever.

41. In a steering mechanism for self-propelled vehicles, the combination of a steering-post, an actuator therein, a shaft located out of alinement with the steering-post and actuated thereby, and a hydraulic checking device controlling said shaft, said device comprising a piston-chamber, a piston dividing the same into two compartments, a valve-chamber, separate passages between the valve-chamber and compartments of the piston-chamber, valves in said passages, and means operated by the actuator of the steering-post for opening the valves.

42. In a steering mechanism for self-propelled vehicles, the combination of a steering-post, an actuator therein, a shaft located out of alinement with the steering-post, means operatively connected with the shaft and steering-post, and a hydraulic checking device controlling said shaft, said device comprising a piston-chamber, a piston therein dividing the same into two compartments, a valve-chamber, passages connecting the valve-chamber with the compartments of the piston-chamber, valves controlling the passages, and a gravity-released lever for opening the valves, which is operated by the actuator in the steering-post.

43. In a steering mechanism for vehicles, the combination of a steering-post, an actuator therein, a shaft located out of alinement with the steering-post and actuated thereby, and a hydraulic checking device controlling said shaft, said device comprising a piston-chamber, a piston dividing the same into two compartments, a valve-chamber, passages connecting the valve-chamber with the compartments of the piston-chamber, valves controlling the passages, a gravity-released lever controlling the valve, and a loose abutting connection between the actuator and lever whereby each returns independently to its normal position.

44. In a steering mechanism for vehicles, the combination of a steering-post, a hand-wheel or lever mounted thereon, an actuator in the post, a shaft located out of alinement with the steering-post, gearing for imparting motion from the post to the shaft, and a hydraulic checking device controlling said shaft, said device comprising a piston-chamber, a piston dividing the chamber into two compartments, a valve-chamber, a passage between each compartment of the piston-chamber and the valve-chamber, gravity-actuated valves therein controlling the passages, an extension formed on the valve-chamber to aline with the steering-post, and a lever pivotally mounted therein to engage with the actuator in the steering-post for opening the valves simultaneously.

45. In a motion-checking device, the combination of a cylinder, a piston for dividing the cylinder-space into fluid-containing compartments, valves for controlling the passage of fluid from one compartment to another, and a means for raising the valves from their seats at the same time.

46. In a motion-checking device, the combination of a cylinder, a piston which divides the cylinder-space into fluid-containing compartments, self-closing valves for regulating the passage of fluid from one compartment to another, and a valve-actuating means which drops out of engagement with the valves.

47. In a steering-check, the combination with a movable piston, of two valves therein, and means for positively opening both valves simultaneously.

48. In a steering-check, the combination with a movable piston having a passage-way through it, of two ball-valves controlling the ends of said passage-way, and means for unseating both valves simultaneously.

49. In a steering-check, the combination with a movable piston having a passage-way, of two ball-valves controlling said passage-way, and a rocker having two fingers respectively engaging said valves.

In witness whereof I have hereunto set my hand this 9th day of January, 1904.

HERMANN LEMP.

Witnesses:
DUGALD McK. McKILLOP,
OTTO F. PERSSON.